(12) United States Patent
Chu

(10) Patent No.: US 11,567,282 B1
(45) Date of Patent: Jan. 31, 2023

(54) FIBER ACCESS EXTENSION OVER POWER LINE DROP

(71) Applicant: FiberRise Communications, LLC, Huntsville, AL (US)

(72) Inventor: Fred Chu, Madison, AL (US)

(73) Assignee: ENTRUST Solutions Group, LLC, Huntsville, AL (US)

( * ) Notice: Subject to any disclaimer, the term of this patent is extended or adjusted under 35 U.S.C. 154(b) by 9 days.

(21) Appl. No.: 17/363,731

(22) Filed: Jun. 30, 2021

(51) Int. Cl.
*G02B 6/00* (2006.01)
*G02B 6/44* (2006.01)
*G02B 6/38* (2006.01)

(52) U.S. Cl.
CPC ......... *G02B 6/4471* (2013.01); *G02B 6/3897* (2013.01)

(58) Field of Classification Search
CPC ....... G02B 6/4471; G02B 6/3897; G02B 6/00
See application file for complete search history.

(56) References Cited

U.S. PATENT DOCUMENTS

| | | | |
|---|---|---|---|
| 7,116,761 B2 | 10/2006 | Ashton et al. | |
| 7,428,366 B2 | 9/2008 | Mullaney et al. | |
| 7,907,843 B2 * | 3/2011 | Yamaji | H04J 3/1694 398/100 |
| 8,326,152 B2 * | 12/2012 | Van Veen | H04B 10/07955 398/94 |
| 8,433,195 B2 | 4/2013 | Biegert et al. | |
| 8,532,490 B2 | 9/2013 | Smith et al. | |
| 8,897,651 B2 * | 11/2014 | Dai | H04J 14/0247 398/154 |
| 9,488,793 B2 | 11/2016 | Register, III | |
| 9,813,156 B2 | 11/2017 | Brown et al. | |
| 10,028,039 B2 | 7/2018 | Vogel | |

(Continued)

FOREIGN PATENT DOCUMENTS

| | | |
|---|---|---|
| CN | 103020359 A | 4/2013 |
| CN | 102819258 B | 7/2014 |

(Continued)

OTHER PUBLICATIONS

Igweani; Optical Fiber Transmission Systems for in-door Next Generation Broadband Access Network; Electronic and Computer Engineering, Wireless Network and Communication Centre (WNCC), School of Engineering and Design, Brunel University,Uxbridge, United Kingdom; Sep. 2014.

(Continued)

*Primary Examiner* — Jennifer Doan
(74) *Attorney, Agent, or Firm* — Paul Sykes; Bradley Arant Boult Cummings LLP

(57) ABSTRACT

Devices, systems, and methods for extending an optical distribution network to an end point in a user's premises over a power line drop cable that supplies metered power to the premises are disclosed. An existing power line drop cable to the premises serves as an intermediate medium to transmit high-bandwidth data from an optical distribution network to a transceiver in a user's premises. Fiber from an optical distribution network connects to an outside-plant optical-to-electronic device comprising at least an optical network unit and a domain master. The device is powered by electricity from the electrical network to which the first power line drop cable is attached. The device can have an electromagnetic-interference filter.

20 Claims, 7 Drawing Sheets

(56) References Cited

U.S. PATENT DOCUMENTS 10,075,779 B2    9/2018   Erreygers et al.
10,819,456 B2   10/2020   Spreemann

FOREIGN PATENT DOCUMENTS

JP        2006091326 A    4/2006
JP          4682016 B2    5/2011

OTHER PUBLICATIONS

Murakami; Design and Characteristics of Aerial Optical Drop Cable with Electric Power Wires; IEICE Trans. Comm., vol. E83-B, No. 1, Jan. 2000.

\* cited by examiner

FIBER ACCESS EXTENSION OVER POWER LINE DROP

FIELD OF INVENTION

This disclosure relates generally to network technology, specifically fiber access extension over existing copper infrastructure.

BACKGROUND

In a typical network for distributing electrical power, there are high-power transmission lines that enter a power substation. The substation includes a range of step-down transformers. The substation also includes busbar for distributing the stepped-down electric power into different paths, ultimately to distribution lines. The distribution lines each run to another step-down transformer to a neighborhood transmitter with further branches that typically include additional step-down transformers to power-line drop-cables to users' premises. The power-line drop cables typically connect to the power meter and then to the fuse or breaker panel at the user premises, from which typically a number of power lines arranged in individual circuits extend through the premises to provide power to appliances, devices, lights, fixtures and the like. Rural electrification systems tend to use higher distribution voltages because of the longer distances covered by the distribution lines. Rural services normally try to minimize the number of poles and wires.

G.hn is the short name for the ITU-T G.996x series of home-networking ("hn") standards, which are fully incorporated herein by reference. G.hn relates to communications over at least three physical mediums: phone line; power line; and coaxial cable. Recent additions to G.hn include narrowband wireless and visible-light communication, which use radio frequency and free-space optical transmission with the basic G.hn modulation and MAC protocol stack. The terms GPON, NGPON1, NGPON2, XGSPON, or other xPON are defined by the ITU Telecommunication Standardization Sector ("ITU-T"), whose G.9xx series of networking standards are publicly available.

It is known in the art to transmit electrical data signals over a twisted-pair copper line (e.g., a telephone line or an Ethernet cable). Such twisted-pair lines are small (typically 22 or 24 American Wire Gauge) and can carry only small amounts of (direct-current) power (typically less than 50 watts). Fiber access extension architectures based on twisted-pair cables from an optical network unit ("ONU") to a user's premises is often called fiber-to-the-curb ("FttC") technology. An FTTC provider runs fiber optic cable to an optical-to-electronic device at the curb near users' premises, or in some instances to such a device in a basement of a multifamily dwelling, and then runs a new twisted-pair line (or uses an existing telephone line) for the last few hundred feet—one solution to the "last mile" problem.

Power lines contrast sharply with such twisted pairs. Power lines are much thicker than twisted pair cables (up to 1.6 million circular mils area) and are adapted to carry much higher (alternating-current) amperage to a business or dwelling—providing into the kilowatts of power. Twisted-pair lines are adapted to carry only small amounts (typically measured in milliamps) of DC power and thus are not suitable for powering a user's premises and as such as not considered to be power lines as term is used in this disclosure.

SUMMARY OF THE INVENTION

The present disclosure describes a fiber access extension over power line drop. Some embodiments are extensions of an optical distribution network ("ODN") over a power line drop cable from a pole- or pedestal-mounted distribution transformer to an end point. Thus, copper of an existing power line drop cable to a user's premises, which also provides power to the premises, can serve as an intermediate medium to transmit high-bandwidth data from an ODN to a transceiver in the user's premises. In one embodiment, fiber from the ODN connects to an outside-plant optical-to-electronic ("O2E") device, which may be in a pole-mounted, environmentally-sealed housing. The O2E device may comprise an optical network unit ("ONU") and a domain master. Fiber may connect to the O2E device at the ONU. The ONU connects to the domain master over a link carrying electrical signals—via an Ethernet cable, for example. A power line drop cable may couple the distribution transformer to the O2E device. A second aspect of the power line drop cable may couple the domain master to at least one end point. The O2E device may be powered by electricity from the electrical network of which the first power line drop cable is a part.

In a first embodiment, a device for extending an optical distribution network ("ODN") to an end point in a user's premises over a power line drop cable that supplies metered power to the premises is provided and comprises: an optical-to-electronic ("O2E") device, wherein the O2E device comprises: an optical network unit ("ONU") adapted to receive an optical broadband signal from the ODN and provide an electrical broadband output signal; a domain master configured to receive an electrical broadband output signal and adapt it for transmission over a power line, the domain master comprising a network input for receiving an electrical broadband signal from the ONU, a power input for receiving power from the power line drop cable, and an output port adapted to transmit the adapted electrical broadband signal over the power line drop cable to the end point.

In a second exemplary embodiment, a device for extending an optical distribution network ("ODN") to an end point in a user's premises over a power line drop cable that supplies metered power to the premises is provided and comprises: an optical-to-electronic ("O2E") device, wherein the O2E device comprises: an optical network unit ("ONU") adapted to receive an optical broadband signal from the ODN and provide an electrical broadband output signal; a domain master configured to receive an electrical broadband output signal and adapt it for transmission over a power line, the domain master comprising a network input for receiving an electrical broadband signal from the ONU, a power input for receiving power from the power line drop cable, and an output port adapted to transmit the adapted electrical broadband signal over the power line drop cable to the end point; and an electromagnetic-interference ("EMI") filter in series with the power line drop cable and the domain master.

In a third exemplary embodiment, a system for providing broadband data services to a user's premises is provided and comprises: an optical-to-electronic ("O2E") device, wherein the O2E device comprises: an optical network unit ("ONU") adapted to be coupled to an optical distribution network ("ODN") and adapted to receive an optical broadband signal from the ODN and a domain master in operative communication with the ONU and adapted to transmit an electrical broadband signal over a power line; an end point adapted to be coupled to a power line in the user's premises and adapted to receive a broadband signal over the power line in the user's premises; and a power line drop cable coupled to the premises power line and to the domain master; wherein the domain master is powered by electricity carried by the power line drop cable.

In a fourth exemplary embodiment, a system for providing broadband data services to a user's premises is provided and comprises: an optical-to-electronic ("O2E") device, wherein the O2E device comprises: an optical network unit ("ONU") adapted to be coupled to an optical distribution network ("ODN") and adapted to receive an optical broadband signal from the ODN and a domain master in operative communication with the ONU and adapted to transmit an electrical broadband signal over a power line; an end point adapted to be coupled to a power line in the user's premises and adapted to receive a broadband signal over the power line in the user's premises; a power line drop cable coupled to the premises power line and to the domain master, wherein the domain master is powered by electricity carried by the power line drop cable; and an electromagnetic-interference ("EMI") filter in series with the power line drop cable and the domain master.

In a fifth exemplary embodiment, a method of providing data services from an optical distribution network ("ODN") over a power line drop cable to an end point, the power line drop cable and end point coupled to a power line in the user's premises, is provided and comprises: receiving an optical data signal by an optical-to-electronic ("O2E") device coupled to the ODN; receiving at a domain master an electrical data signal converted from the optical data signal by the O2E device; adapting the electrical data signal for transmission over a power line; and transmitting the electrical data signal from the domain master over the power line drop cable and the premises power line to the end point; wherein the domain master is powered by electricity carried by the power line drop cable.

In a sixth exemplary embodiment, a method of providing data services from an optical distribution network ("ODN") over a power line drop cable to an end point, the power line drop cable and end point coupled to a power line in the user's premises, is provided and comprises: receiving an optical data signal by an optical-to-electronic ("O2E") device coupled to the ODN; receiving at a domain master an electrical data signal converted from the optical data signal by the O2E device; and adapting the electrical data signal for transmission over a power line; transmitting the electrical data signal from the domain master over the power line drop cable and the premises power line to the end point, wherein the domain master is powered by electricity carried by the power line drop cable; and filtering electromagnetic interference from the power line drop cable.

The above summary presents a simplified overview to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The following drawings are attached to—and form a portion of—this disclosure.

DEFINITIONS

Figure 1:
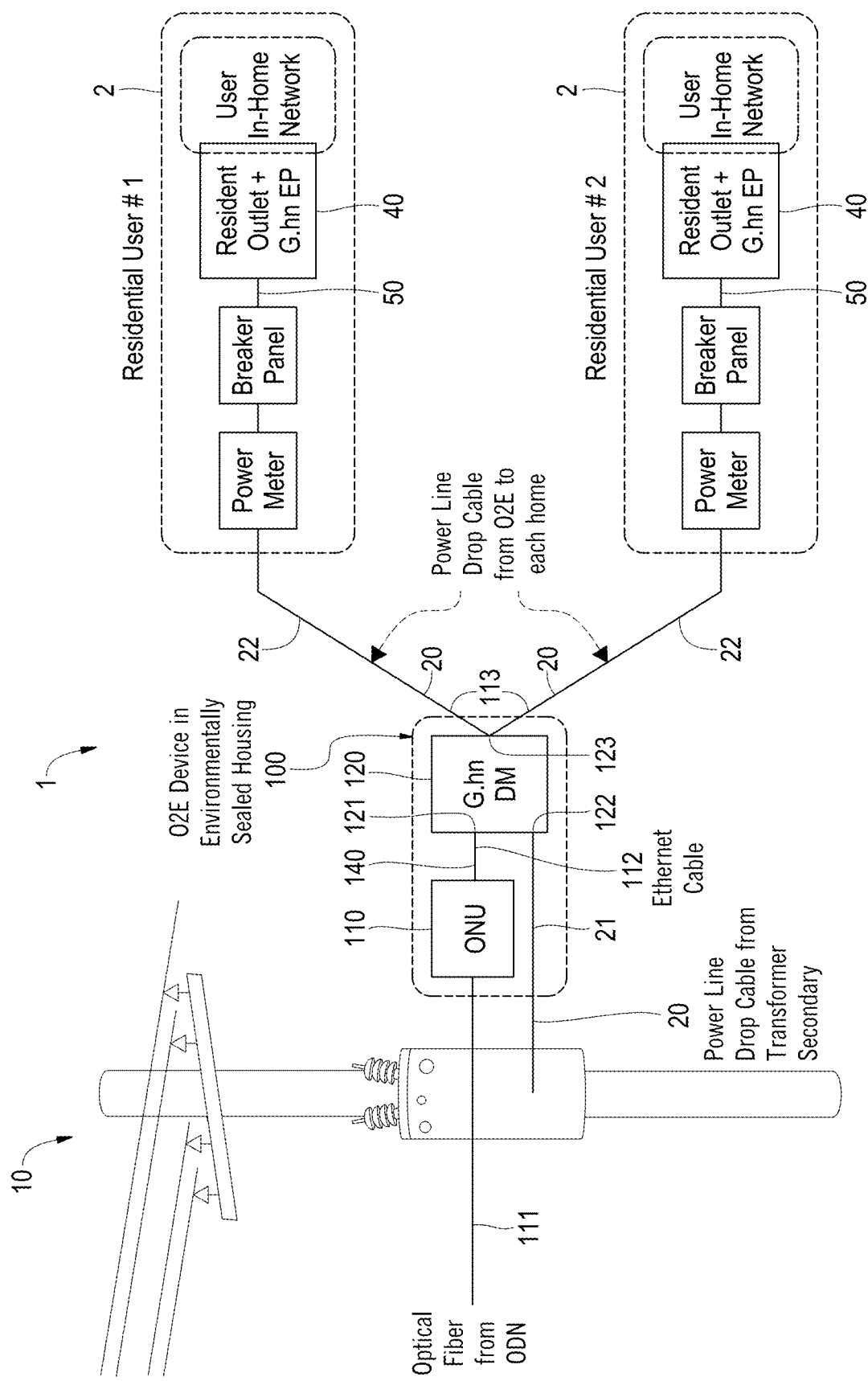
FIG. 1 is a schematic view of an embodiment of a system for providing broadband data services to at least one user's premises.

Unless otherwise defined, all terms (including technical and scientific terms) in this disclosure have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly defined otherwise in this disclosure. For brevity or clarity, well known functions or constructions may not be described in detail.

The terms "about" and "approximately" shall generally mean an acceptable degree of error or variation for the quantity measured in light of the nature or precision of the measurements. Typical, exemplary degrees of error or variation are within 20 percent (%), preferably within 10%, more preferably within 5%, of a given value or range of values. Numerical quantities given in this description are approximate unless stated otherwise, meaning that the term "about" or "approximately" can be inferred when not expressly stated.

The terminology used throughout the disclosure is for the purpose of describing particular embodiments only and is not intended to be limiting. The singular forms "a," "an," and "the" are intended to include the plural forms as well, unless the context clearly indicates otherwise.

The terms "first," "second," and the like are used to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the disclosure. Likewise, terms like "top" and "bottom"; "front" and "back"; and "left" and "right" are used to distinguish certain features or elements from each other, but it is expressly contemplated that a top could be a bottom, and vice versa.

The term "consisting essentially of" means that, in addition to the recited elements, what is claimed may also contain other elements (steps, structures, ingredients, components, etc.) that do not adversely affect the operability of what is claimed for its intended purpose as stated in this disclosure. This term excludes such other elements that adversely affect the operability of what is claimed for its intended purpose as stated in this disclosure, even if such other elements might enhance the operability of what is claimed for some other purpose.

The terms "connected to," "coupled to," "coupled with," "in connection with," "in operative communication with," "in communication with," or "connecting" include any suitable connection, coupling, or communication, including mechanical connection, electrical connection (e.g., one or more wires), or signal-conducting channel (e.g., Bluetooth®, Near-Field Communication ("NFC"), or other inductive coupling or radio-frequency ("RF") link).

The term "processor" may include one or more processors having processing capability necessary to perform the processing functions described herein, including but not limited to hardware logic, computer readable instructions running on a processor, or any suitable combination thereof. A processor may run software to perform the operations described herein, including software accessed in machine readable form on a tangible non-transitory computer readable storage medium, as well as software that describes the configuration of hardware such as hardware description language ("HDL") software used for designing chips.

The term "signal" means any suitable signal, for example a voltage, a current, a duty cycle, a frequency or amplitude of electrical, electromagnetic, or optical oscillation, or a mechanical signal (e.g., pressure, vibration, a tap, or other mechanical signal) in some embodiments.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

The following description illustrates and describes the processes, machines, manufactures, compositions of matter, and other teachings of the present disclosure. The disclosure shows and describes only certain embodiments of the processes, machines, manufactures, compositions of matter, and other teachings disclosed; but as mentioned above, it is to be understood that the teachings of the present disclosure are capable of use in various other combinations, modifications, and environments and are capable of changes or modifications within the scope of the teachings of this disclosure, commensurate with the skill and knowledge of a person having ordinary skill in the relevant art.

The embodiments described are further intended to explain certain preferred modes of practicing the processes, machines, manufactures, compositions of matter, and other teachings of the disclosure and to enable others skilled in the art to utilize the teachings of the disclosure in such, or other, embodiments and with the various modifications required by the particular applications or uses. Accordingly, the processes, machines, manufactures, compositions of matter, and other teachings of the present disclosure are not intended to limit the embodiments and examples disclosed herein. Any section headings herein are provided only for consistency with the suggestions of 37 C.F.R. § 1.77 or otherwise to provide organizational cues. These headings shall not limit or characterize the invention(s) set forth herein.

DETAILED DESCRIPTION

Devices, systems, and methods have been developed and are herein described at least for: (1) extending an optical distribution network ("ODN") to an end point in a user's premises over a power line drop cable that supplies metered power to the premises; (2) providing broadband data services to a user's premises; and (3) providing data services from an ODN over a power line drop cable to an end point (the power line drop cable and end point coupled to a power line in the user's premises).

Devices, systems, and methods have been developed and are herein disclosed for a fiber-to-the-power-line-extension ("FttPLE") architecture, which might provide fiber-like bandwidth to users. The disclosures herein may be useful for reducing the cost of fiber deployment while still achieving data rates greater than approximately 100 megabits per second ("Mbps"). The disclosures herein may also allow users to install their own end points and residential gateways without a truck roll after the optical-to-electronic ("O2E") device is installed on a (utility) pole or pedestal.

FIG. 1 is a schematic view of an embodiment of a system 1 for providing broadband data services to at least one user's premises 2. The system 1 comprises at least one optical-to-electronic ("O2E") device 100. The O2E device 100 is configured to convert an optical data signal to an electrical data signal. In some embodiments, the O2E device 100 may be pole- or pedestal-mounted.

The O2E device 100 comprises an optical network unit ("ONU") 110 adapted to be coupled to an optical distribution network ("ODN") 10. The ONU 110 is adapted to receive an optical broadband signal 111 (or other optical data signal) from the ODN 10 usually over a fiber optical cable. The ONU 110 may be a GPON, NGPON1, NGPON2, XGSPON, or other xPON optical network unit.

The O2E device 100 further comprises a domain master 120 in operative communication with the ONU 110. The domain master 120 is adapted to be powered by electricity carried by a power line drop cable 20, having a first aspect 21 and a second aspect 22 (each a "power line drop cable segment"). In some embodiments, the domain master 120 may be coupled to the power line drop cable 20 by a tap into the power line drop cable 20. The domain master 120 receives an electrical broadband signal from the ONU 110 and adapts it for transmission (e.g., as adapted electrical broadband output signal 113 or other electrical data signal) over at least one power line (e.g., the second aspect 22 of power line drop cable 20). The domain master 120 may be a G.hn domain master. The domain master 120 may have a direct data link to the ONU 110. The domain master 120 may serve up to approximately eight subscribers or users in a point-to-multipoint ("P2MP") topology. In some embodiments, a domain master may aggregate a variety of internet-of-things data-streams (e.g., from sensors such as weather sensors including temperature, humidity, and other sensors) as part of FttPLE services.

The system 1 further comprises at least one end point 40 adapted to be coupled to a power line in the user's premises 2 (e.g., the second aspect 22 of power line drop cable 20 or a premises power line 50 or both). The end point 40 is adapted to receive the adapted broadband signal 113 (or other electrical data signal) over a power line (e.g., the second aspect 22 of power line drop cable 20 or the premises power line 50 or both). The power line drop cable 20 (e.g., its second aspect 22) may function as an intermediate medium to transmit high-bandwidth data.

In some embodiments, the domain master 120 comprises: a network input 121 for receiving an electrical broadband signal (e.g., electrical broadband output signal 112) (or other electrical data signal) from the ONU 110; a power input 122 for receiving power from the power line drop cable 20 (e.g., from its first aspect 21); and an output port 123 adapted to transmit the adapted electrical broadband output signal 113 (or other electrical data signal converted—for example, by the O2E device 100—from an optical data signal) over a power line (e.g., over the second aspect 22 of power line drop cable 20 or over the premises power line 50 or over both) to the end point 40.

In some embodiments, the domain master 120 is adapted to be connected to the ONU 110 by an Ethernet cable (e.g., the Ethernet cable 140). In some embodiments, the domain master 120 is adapted to receive power from a power line (e.g., from the first aspect 21 of power line drop cable 20) through a step-down transformer (not specifically shown). In some embodiments, the domain master 120 is adapted to receive power from an induction device (not specifically shown) coupled to a power line (e.g., to the first aspect 21 of power line drop cable 20).

Figure 2:
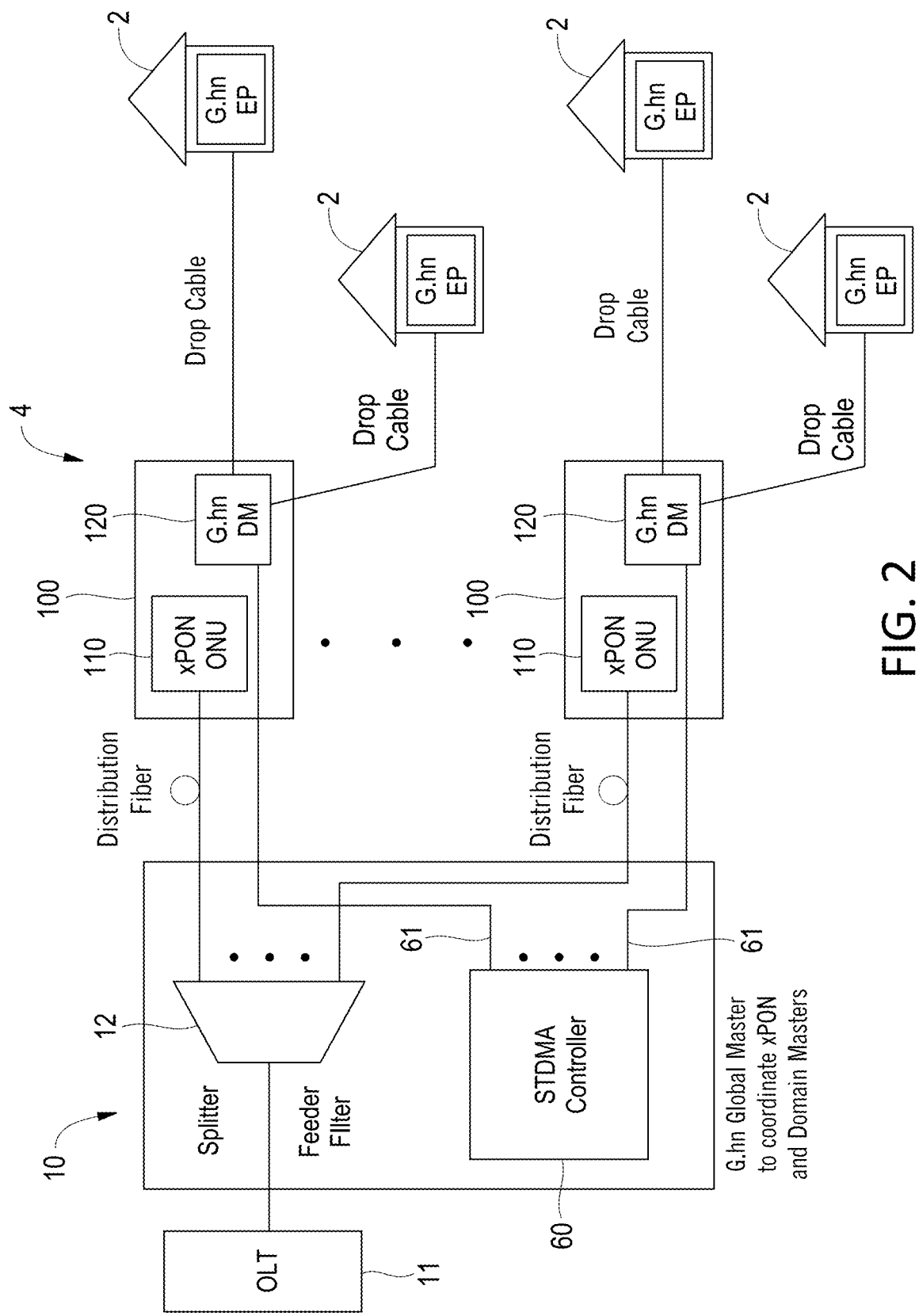
FIG. 2 is a schematic view of an embodiment of a system for providing broadband data services to at least one user's premises.

FIG. 2 is a schematic view of an embodiment of a system 4 for providing broadband data services to at least one user's premises 2. The ODN 10 may comprise an optical line terminal ("OLT") 11. The OLT 11 may be configured to make data transfers between a core network (not shown) and the ODN 10 (e.g., by using xPON technology). The ODN may comprise at least one passive splitter 12 to distribute optical fiber into multiple fiber feeds where one OLT port could feed up to sixty-four ONUs 110.

In many areas, utility poles may be located between approximately 100 meters and approximately 300 meters apart, so ONUs 110 on neighboring poles could potentially interfere with each other if their transmissions are not coordinated.

The system 4 comprises a global master 60 in operative communication with the ODN 10 and the O2E devices 100 in a predefined area. The global master 60 is configured to control the domain masters 120. In some embodiments (as shown for example in FIG. 2) the global master 60 is a self-organized time-division multiple-access ("STDMA") controller. (Because xPON architectures may be time-division multiple-access ("TDMA") controlled, there might be little or no loss of capacity in each ONU 110—from the statistical multiplexing perspective—for each user's premises sharing the same ONU 110.) A global master 60 may perform frame synchronization signaling and time-slot allocations for the O2E devices 100 nearby.

In some embodiments, the global master 60 is physically connected to the ODN 10. In some embodiments, the global master 60 resides in a network core (not shown) of the ODN 10. In some embodiments, the global master 60 is configured to send control signals 61 to each domain master 120 to avoid collision of data packets (not shown). The global master 60 may monitor the traffic demands of each ONU 110 and allocate bandwidth slots for each domain master 120 to avoid collision. To synchronize the transmission frames among domain masters 120 (to avoid collision and self-interference), each ONU 110 may carry a network timing reference clock signal. In some embodiments, the global master 60 resides in a network cloud (not shown) in operative communication with the ODN 10 that is configured to send and receive control packets (not shown) through an encrypted backbone (not shown) to the ODN 10.

Figure 3:
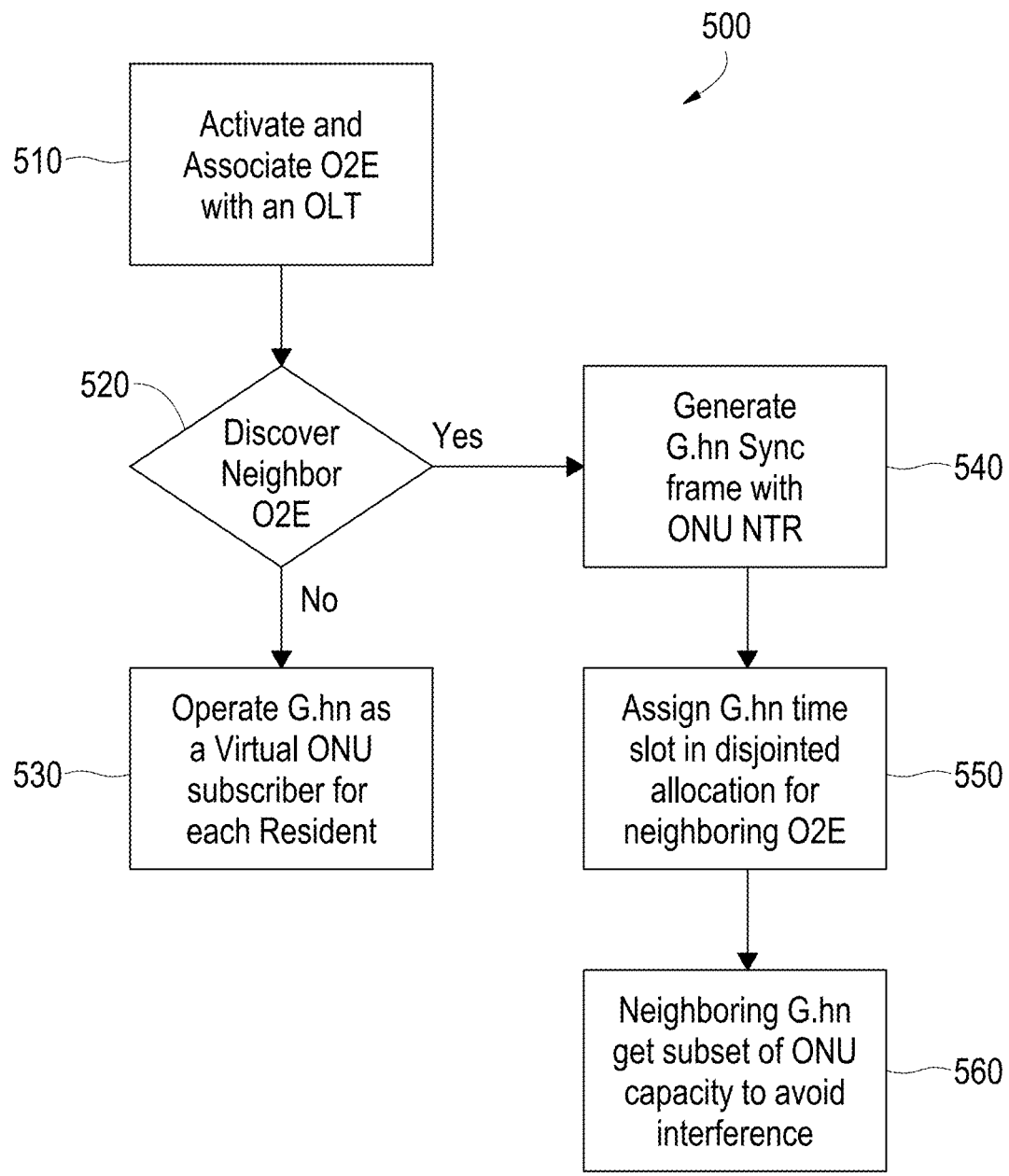
FIG. 3 is a flowchart of a method of using a global master in accordance with some embodiments of a system for providing broadband data services to at least one user's premises.

FIG. 3 is a flowchart of a method 500 of using a global master 60 in accordance with some embodiments of a system 1 for providing broadband data services to at least one user's premises 2. The method of FIG. 3 may be implemented in a global master 60 that is a STDMA controller. The method 500 comprises steps 510, 520, 530, 540, 550, and 560. Step 510 comprises activating and associating an O2E device 100 with an OLT 11 (see FIG. 2). Step 520 comprises discovering a neighbor O2E device 100 (see FIG. 2). If step 520 fails in discovering a neighbor O2E device 100, then method 500 proceeds to step 530. Step 530 comprises operating the G.hn as a virtual ONU subscriber for each resident (or user). If step 520 succeeds to discovering a neighbor O2E device 100, then method 500 proceeds to step 540. Step 540 comprises generating G.hn Sync frame with ONU network traffic redirection ("NTR"). Step 550 comprises assigning G.hn a time slot in disjointed allocation for neighboring O2E device 100 (see FIG. 2). Step 560 comprises a neighboring G.hn getting a subset of ONU capacity to avoid interference.

The data capacity of G.hn is similar to that of G.PON. Therefore, to maintain a fiber-like quality of experience, the passive optical splitter ratio may be reduced from 64/32 to 16/8 to serve the same number of users with the same OLT feed.

Figure 4:
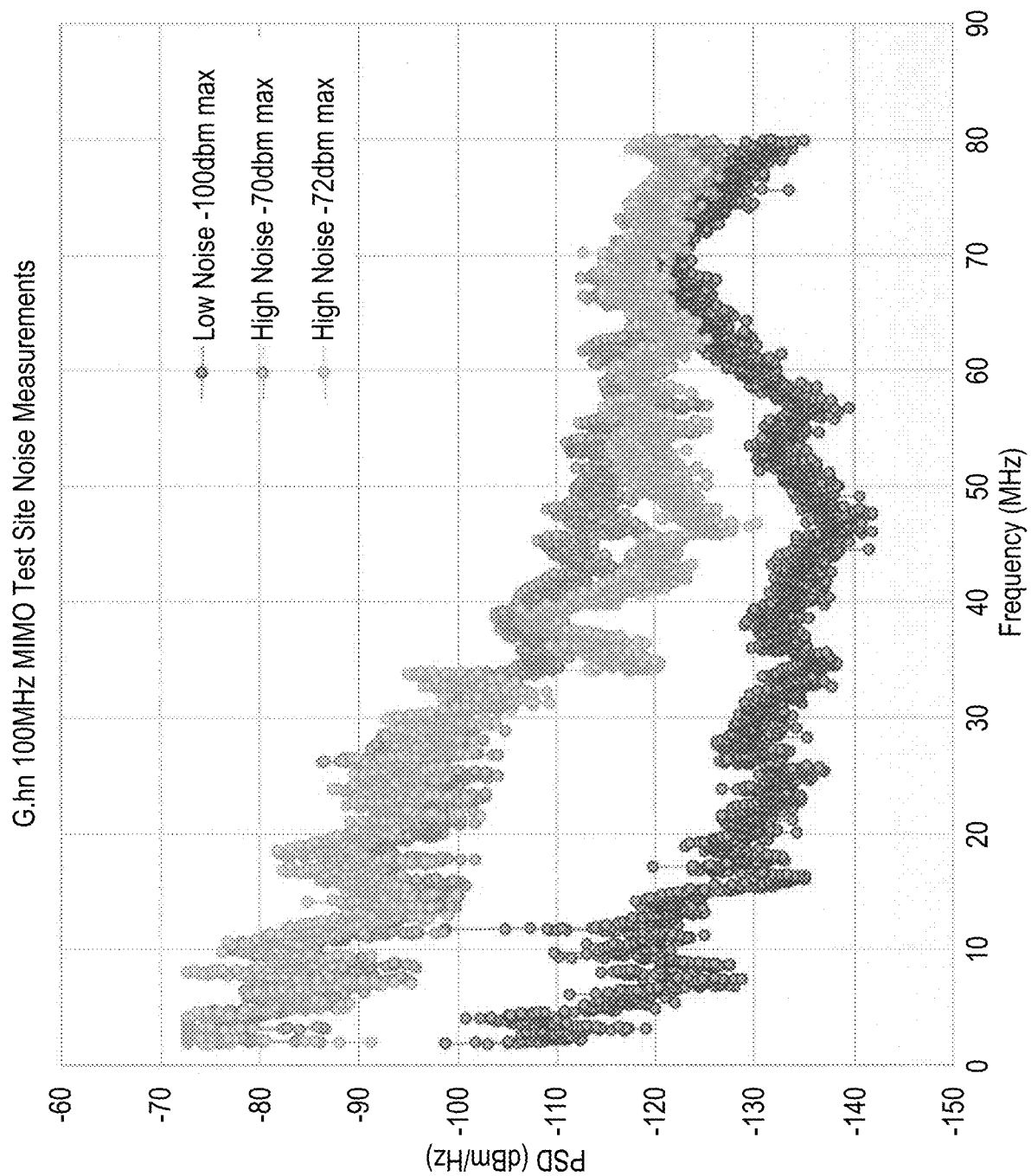
FIG. 4 is a graph of noise properties of some embodiments of a system for providing broadband data services to at least one user's premises, as measured in some environments.

FIG. 4 is a graph of noise properties of some embodiments of a system (e.g., system 1 or system 2) for providing broadband data services to at least one user's premises 2, as measured in some environments. As described above, a global master 60 may mitigate interference from neighboring systems. But in some environments, there may be other sources of noise. For example, some light-industrial areas may have electric-motor—driven machines that generate high-frequency harmonics onto a power line—including in the 2-80 MHz band used by some G.hn architectures, as shown in FIG. 4. This noise could be time-varying.

Figure 5:
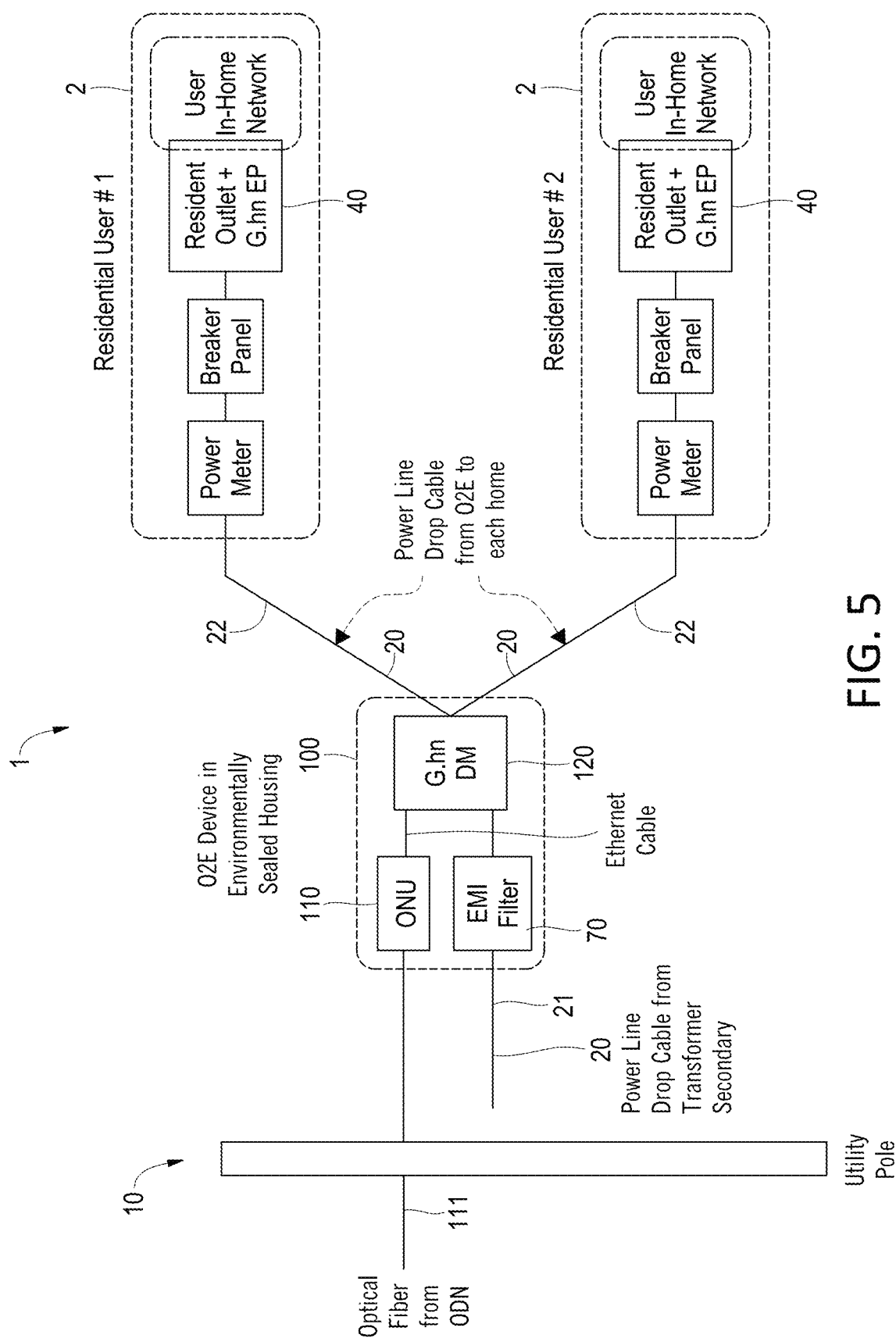
FIG. 5 is a schematic view of a preferred embodiment of the system of FIG. 1, showing an optional EMI filter.

FIG. 5 is a schematic view of a preferred embodiment of system 1 for providing broadband data services to at least one user's premises 2, in which an optional electromagnetic-interference ("EMI") filter 70 has been added. The EMI filter 70 is in series with a power line drop cable (e.g., with a first aspect 21 of power line drop cable 20) and the domain master 120. The EMI filter 70 is configured to filter electromagnetic interference from a power line (e.g., from the first aspect 21 of power line drop cable 20). An EMI filter 70 may be a 1 MHz-cutoff, fourth-order low-pass filter. The EMI filter 70, for example, may be one of: AC EMI filters; a 200 A-rated EMI filter; a high-current-rating EMI filter; a 1 MHz-cutoff, fourth-order, low-pass EMI filter; an EMI isolation filter; a second-order LC filter; two or more segments of a second-order LC filter, cascaded to create a higher-order filter; an eighth-order filter; an EMI filter from SHAFFER; an EMI filter from KEMET; a SCHAFFNER high-current-rating EMI filter; KEMET filter; KEMET EMI filter; SCHAFFNER 120 A MAX filter; —SCHAFFNER high-current-rated 300 A EMI filter; off-the-shelf filters with some current-rating enhancement;

Some embodiments of an EMI filter 70 may effect greater than approximately 30 dB of common-mode and differential-mode rejection, which may ensure stable performance of the system 1 and/or O2E device 100. In such embodiments, there may be greater than approximately 60 dB of electrical isolation between power line drop cables. In some environments, that could at least partially obviate the need for a global master 60 to effect time-slot sharing and STDMA controlling. The potential extra cost of EMI filters may be shared among multiple users and therefore be lower cost than running fiber to the users' premises 2. In some embodiments, each transformer may be served by one ONU 110 and one domain master 120 with a single, high-current EMI filter 70. In some embodiments, the first aspect 21 of each power line drop cable 20 may be fitted with a lower-current-rated EMI filter 70 and its own domain master 120. In some embodiments, an EMI filter 70 may be placed in a user's premises 2.

An EMI filter 70 could be used for green-energy-generator isolation (e.g., DC-to-AC-conversion noise from solar panels or wind turbines). When power sources or generators of distributed power are not "pure sine wave" generators and are connected to a utility grid, an EMI filter 70 may help stabilize performance of the devices, systems, and methods described herein. An EMI filter 70 may be optimized for the bandwidth of interest, for the size of the load, for the size of the power-line cables, and according to government regulations and to safety standards.

The number of users per utility pole (i.e., per O2E device 100) can be impacted by the number of splitters (e.g., passive splitters 12, shown in FIG. 2) as well as by the current-rating of the feeding transformer. Some rural transformers are either approximately 75-kilovolt or approximately 50-kilovolt transformers with maximum root-mean-square currents of between approximately 160 amperes and approximately 110 amperes. Some residential breaker panels are rated only up to approximately 100 amperes. An EMI filter 70 may be configured to comply with such safety ratings and standards.

In some embodiments, as shown in FIG. 5, a device for extending an ODN 10 to at least one end point 40 in a user's premises 2 over a power line drop cable (e.g., the second aspect 22 of power line drop cable 20) that supplies metered power to a user's premises 2 comprises an O2E device 100 that further comprises an EMI filter 70 in series with a power line drop cable (e.g., the first aspect 21 of power line drop cable 20) and the domain master 120.

Figure 6:
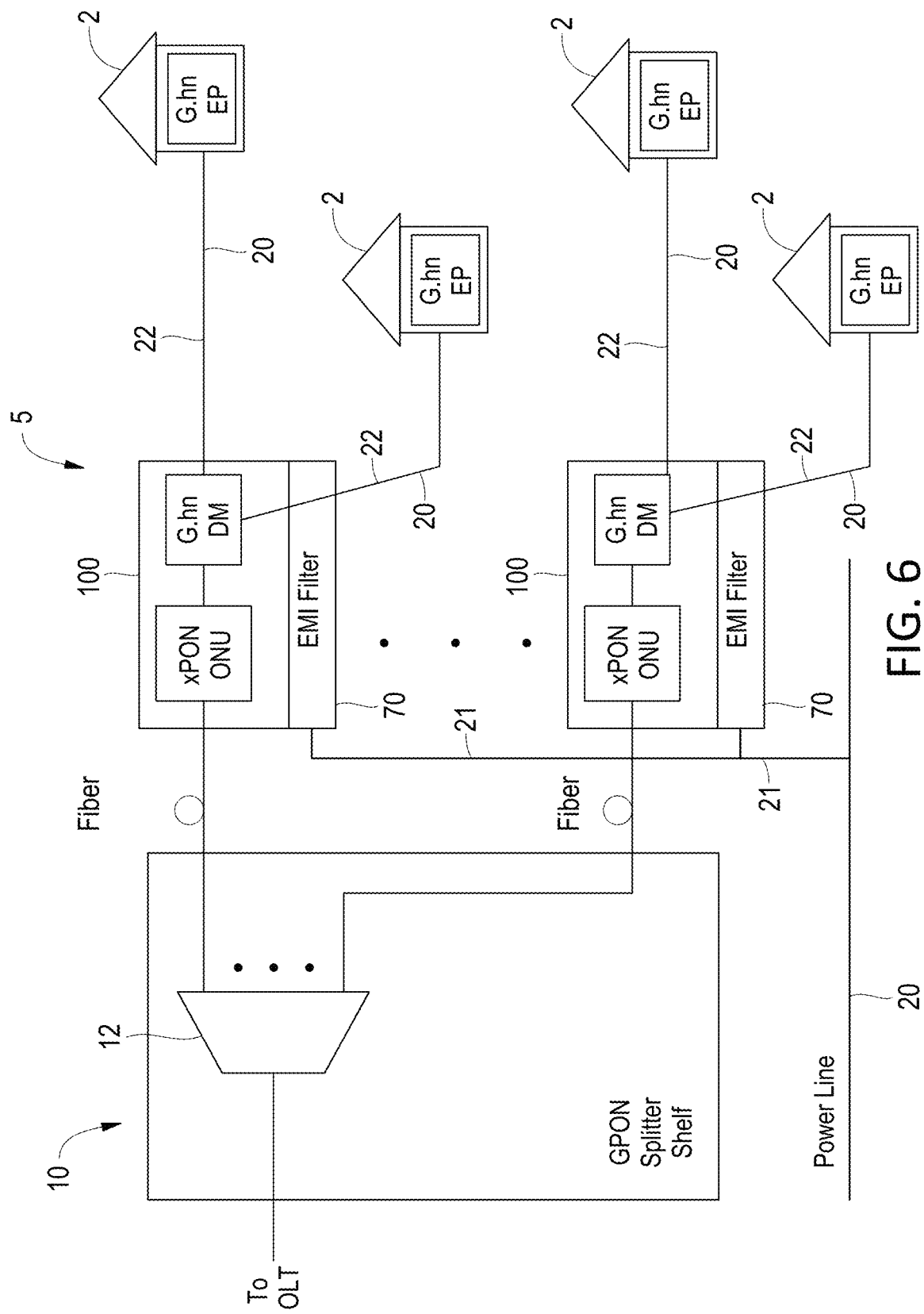
FIG. 6 is a schematic view of an embodiment of a system for providing broadband data services to at least one user's premises.

FIG. 6 is a schematic view of an embodiment of a system 5 for providing broadband data services to at least one user's premises 2. As explained above, in some environments some embodiments of the system 5 comprising at least one EMI filter 70 optionally may not have any global master. FIG. 6 depicts an embodiment of a system 5 having an EMI filter 70 and no global master.

Figure 7:
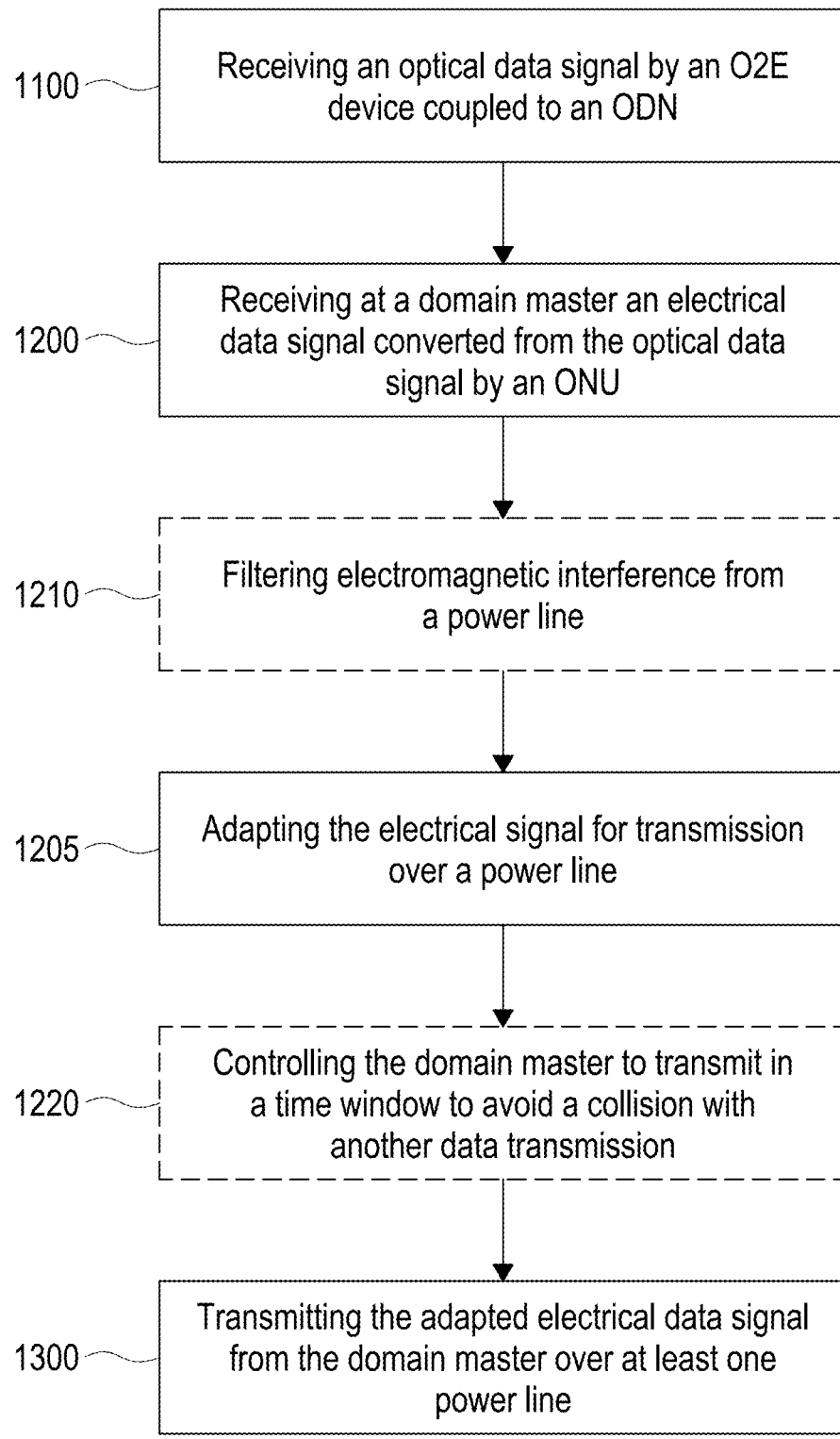
FIG. 7 is a flowchart of an embodiment of a method of providing data services from an optical distribution network ("ODN") over a power line drop cable to at least one end point.

FIG. 7 depicts a method 1000 of providing data services. Some of the systems and devices described above, with reference to FIGS. 1-6, may be used with the following methods In the following description of FIG. 7, reference should be taken to the depictions of systems and devices in FIGS. 1-6.

FIG. 7 is a flowchart of an embodiment of a method 1000 of providing data services from an ODN 10 over at least one power line to at least one end point 40—the at least one power line and at least one end point 40 coupled to a power line in the user's premises 2 (e.g., premises power line 50). Method 1000 comprises steps 1100, 1200, 1205, and 1300. Step 1100 of method 1000 comprises receiving an optical data signal (e.g., optical broadband signal 111) by an O2E device 100 coupled to an ODN 10. Step 1200 of method 1000 comprises receiving at a domain master 120 an electrical data signal (e.g., electrical broadband output signal 112) converted from the optical data signal by an ONU 110. In some embodiments, the method 1000 comprises optional step 1210. Step 1210 comprises filtering electromagnetic interference from a power line (e.g., from a first aspect 21 of the power line drop cable 20). Step 1205 comprises adapting the electrical signal for transmission over a power line (e.g., over a second aspect 22 of power line drop cable 20), for example by employing a TDMA architecture to schedule transmissions. In some embodiments, the method 1000 comprises optional step 1220. Step 1220 comprises controlling (e.g., by a global master 60) the domain master 120 to transmit in a time window to avoid a collision with another data transmission (e.g., another data transmission on the same power line drop cable 20). Step 1300 of method 1000 comprises transmitting the adapted electrical data signal from the domain master over at least one power line (e.g., at least one second power line drop cable 30 or premises power line 50 or both) to an end point 40.

While the foregoing specification has described specific embodiments of this invention and many details have been put forth for the purpose of illustration or example, it will be apparent to one skilled in the art that the invention is susceptible to additional embodiments and that certain of the details described herein can be varied considerably without departing from the basic principles of the invention.

What is claimed is:

1. A device for extending an optical distribution network ("ODN") to an end point in a user's premises over a power line drop cable, comprising:
   an optical-to-electronic ("O2E") device, wherein the O2E device comprises:
      an optical network unit ("ONU") adapted to receive an optical broadband signal from the ODN and to provide an electrical broadband output signal; and
      a domain master configured to receive an electrical broadband output signal and adapt it for transmission over a power line, the domain master comprising:
         a network input for receiving the electrical broadband signal from the ONU,
         a power input for receiving power from the power line drop cable,
         and an output port adapted to transmit the adapted electrical broadband signal over the power line drop cable to the end point.

2. The device of claim 1, wherein the domain master is adapted to be connected to the ONU by an Ethernet cable.

3. The device of claim 1, wherein the domain master is adapted to receive power from the power line drop cable through a step-down transformer.

4. The device of claim 1, wherein the domain master is adapted to receive power from an induction device coupled to the power line drop cable.

5. The device of claim 1, wherein the O2E device further comprises an electromagnetic-interference ("EMI") filter in series with the power line drop cable and the domain master.

6. The device of claim 5, wherein the domain master is adapted to be connected to the ONU by an Ethernet cable.

7. The device of claim 5, wherein the domain master is adapted to receive power from the power line drop cable through a step-down transformer.

8. The device of claim 5, wherein the domain master is adapted to receive power from an induction device coupled to the power line drop cable.

9. A system for providing broadband data services to a user's premises, comprising:
   an optical-to-electronic ("O2E") device, wherein the O2E device comprises:
      an optical network unit ("ONU") adapted to be coupled to an optical distribution network ("ODN") and to receive an optical broadband signal from the ODN, and
      a domain master configured to receive an electrical broadband output signal the ONU and to adapt it for transmission over a power line;
   an end point adapted to be coupled to a premises power line in the user's premises and adapted to receive the adapted broadband signal over the premises power line; and
   a power line drop cable coupled to the premises power line and to the domain master;
   wherein the domain master is adapted to be powered by electricity carried by the power line drop cable.

10. The system of claim 9, further comprising a global master in operative communication with the ODN and the O2E device, wherein the global master is configured to control the domain master.

11. The system of claim 9, further comprising an electromagnetic-interference ("EMI") filter in series with the power line drop cable and the domain master.

12. The system of claim 11, further comprising a global master in operative communication with the ODN and the O2E device, wherein the global master is configured to control the domain master.

13. The system of claim 12, wherein the global master is a self-organized time-division multiple-access controller.

14. The system of claim 12, wherein the global master is physically connected to the ODN.

15. The system of claim 12, wherein the global master resides in a network core of the ODN.

16. A method of providing data services from an optical distribution network ("ODN") over a power line drop cable to an end point, the power line drop cable and end point coupled to a power line in a user's premises, comprising:
  receiving an optical data signal by an optical-to-electronic ("O2E") device coupled to the ODN;
  receiving at a domain master an electrical data signal converted from the optical data signal by the O2E device;
  adapting the electrical data signal for transmission over a power line; and
  transmitting the adapted electrical data signal from the domain master over the power line drop cable and the premises power line to the end point,
  wherein the domain master is powered by electricity carried by the power line drop cable.

17. The method of claim 16, further comprising filtering electromagnetic interference from the power line drop cable.

18. The method of claim 16, further comprising controlling the domain master to transmit in a time window to avoid a collision with another data transmission on the same power line drop cable segment.

19. The method of claim 18, wherein controlling the domain master to transmit in a time window to avoid a collision with another data transmission on the same power line drop cable segment is by a global master which is a self-organized time-division multiple-access controller, wherein the global master sends control signals to each domain master to avoid collision of data packets.

20. The method of claim 19, wherein the global master resides in a network cloud that sends and receives control packets through an encrypted backbone.

* * * * *